United States Patent
Chi

(10) Patent No.: US 10,677,889 B2
(45) Date of Patent: Jun. 9, 2020

(54) SIGNAL PROCESSING SYSTEM AND SIGNAL PROCESSING METHOD FOR OBJECT DETECTION OR DATA TRANSMISSION

(71) Applicant: RichWave Technology Corp., Taipei (TW)

(72) Inventor: Hsiang-Feng Chi, Taipei (TW)

(73) Assignee: RichWave Technology Corp., Taipei (TW)

(*) Notice: Subject to any disclaimer, the term of this patent is extended or adjusted under 35 U.S.C. 154(b) by 198 days.

(21) Appl. No.: 15/925,722

(22) Filed: Mar. 19, 2018

(65) Prior Publication Data

US 2019/0072640 A1 Mar. 7, 2019

(30) Foreign Application Priority Data

Sep. 4, 2017 (TW) .............................. 106130134 A

(51) Int. Cl.
*G01S 7/02* (2006.01)
*G01S 13/58* (2006.01)
(Continued)

(52) U.S. Cl.
CPC .............. *G01S 7/023* (2013.01); *G01S 7/282* (2013.01); *G01S 7/285* (2013.01); *G01S 13/003* (2013.01);
(Continued)

(58) Field of Classification Search
CPC .... G01S 13/003; G01S 13/0209; G01S 13/06; G01S 13/26; G01S 13/325; G01S 13/346;
(Continued)

(56) References Cited

U.S. PATENT DOCUMENTS

| | | | |
|---|---|---|---|
| 2005/0083996 A1* | 4/2005 | Robinson | H04B 1/707 375/131 |
| 2007/0109175 A1 | 5/2007 | Fukuda | |

(Continued)

FOREIGN PATENT DOCUMENTS

| | | | |
|---|---|---|---|
| EP | 1089476 A1 * | 4/2000 | |
| JP | H08-125581 A | 5/1996 | |

(Continued)

*Primary Examiner* — Timothy X Pham
(74) *Attorney, Agent, or Firm* — Winston Hsu

(57) ABSTRACT

A signal processing system includes a transmission module and a receiving module. The transmission module generates and transmits a transmitted radio frequency signal according to a data signal and a first spread vector. The transmission module includes a spread spectrum unit, a digital-to-analog converter and a mixer. The spread spectrum unit generates a spread spectrum signal according to the data signal and the first spread vector. The digital-to-analog unit generates an analog signal according to the spread spectrum signal. The mixer mixes the analog signal and a carrier signal so as to generate the transmitted radio frequency signal. The receiving module receives a received radio frequency signal and a second spread vector so as to generate a spectrum despread signal and generate object detection information data accordingly. The received radio frequency signal is generated by having the transmitted radio frequency signal reflected by a measured object.

18 Claims, 14 Drawing Sheets

(51) Int. Cl.
| | |
|---|---|
| *G01S 13/02* | (2006.01) |
| *G01S 13/26* | (2006.01) |
| *G01S 13/34* | (2006.01) |
| *G01S 13/00* | (2006.01) |
| *G01S 13/32* | (2006.01) |
| *G01S 7/282* | (2006.01) |
| *G01S 7/285* | (2006.01) |
| *G01S 13/06* | (2006.01) |
| *H04B 1/707* | (2011.01) |
| *H04B 1/7073* | (2011.01) |

(52) U.S. Cl.
 CPC .......... *G01S 13/0209* (2013.01); *G01S 13/06* (2013.01); *G01S 13/26* (2013.01); *G01S 13/325* (2013.01); *G01S 13/346* (2013.01); *G01S 13/582* (2013.01); *G01S 13/584* (2013.01); *H04B 1/707* (2013.01); *H04B 1/7073* (2013.01)

(58) Field of Classification Search
 CPC ...... G01S 13/582; G01S 13/584; G01S 7/023; G01S 7/282; G01S 7/285; H04B 1/707; H04B 1/7073
 See application file for complete search history.

(56) References Cited

U.S. PATENT DOCUMENTS

| | | | |
|---|---|---|---|
| 2009/0074031 | A1 | 3/2009 | Fukuda |
| 2010/0207820 | A1* | 8/2010 | Kawano ................ G01S 11/02 342/393 |
| 2011/0012774 | A1 | 1/2011 | Sakai |
| 2011/0169684 | A1 | 7/2011 | Margolin |
| 2011/0216810 | A1* | 9/2011 | Kumar ................ H04B 1/0483 375/146 |
| 2013/0314268 | A1 | 11/2013 | Fukuda |

FOREIGN PATENT DOCUMENTS

| | | |
|---|---|---|
| JP | 2001-264425 A | 9/2001 |
| JP | 2002-62350 A | 2/2002 |
| JP | 2016-145818 A | 8/2016 |

* cited by examiner

The modulated signal Sm1

The modulated signal Sm1

SIGNAL PROCESSING SYSTEM AND SIGNAL PROCESSING METHOD FOR OBJECT DETECTION OR DATA TRANSMISSION

CROSS REFERENCE TO RELATED APPLICATION

This application claims priority to Taiwan Patent Application No. 106130134, filed Sep. 4, 2017, and incorporated herein by reference in its entirety.

TECHNICAL FIELD

The application relates to a signal processing system and a signal processing method, and more particularly, a signal processing system and a signal processing method for object detection or data transmission according to a spread spectrum signal.

BACKGROUND

A measured object can be detected by transmitting electromagnetic waves from a microwave sensor and having the electromagnetic waves reflected by the measured object. For example, microwave radars have been commonly used to transmit narrow band electromagnetic waves without spreading spectrum. However, it is difficult for current techniques to suppress interference (including co-channel interference from others radar signal sources) observed on radio channels. Hence, a better solution is still required for better interference suppression.

SUMMARY

An embodiment provides a signal processing system including a transmission module and a reception module. The transmission module is used to generate and transmit a transmission radio frequency signal according to a data signal and a first spread vector. The transmission module includes a spread spectrum unit, a digital-to-analog converter and a first mixer. The spread spectrum unit is used to generate a spread spectrum signal according to the data signal and the first spread vector. The digital-to-analog converter is coupled to the spread spectrum unit and used to generate a first analog signal according to the spread spectrum signal. The first mixer is coupled to the digital-to-analog converter and used to mix the analog signal with a first carrier signal to generate the transmission radio frequency signal. The reception module is used to receive a reception radio frequency signal and a second spread vector and generate a spectrum despread signal where the reception radio frequency signal is generated by having the transmission radio frequency signal reflected by a measured object. The reception module includes a second mixer, an analog-to-digital converter, a spectrum despread unit and a processor. The second mixer is coupled to a reception unit and used to mix the reception radio frequency signal with a second carrier signal to generate a second analog signal. The analog-to-digital converter is coupled to the second mixer and used to generate a digital signal according to the second analog signal. The spectrum despread unit is coupled to the analog-to-digital converter and used to generate the spectrum despread signal according to the digital signal and the second spread vector. The processor is used to generate detection data according to the spectrum despread signal where the detection data is corresponding to spatial information of the measured object.

Another embodiment provides a signal processing system including a reception module and a processor. The reception module includes a reception terminal, a mixer, an analog-to-digital converter and a spectrum despread unit. The reception terminal is used to receive a radio frequency signal comprising transmission data. The mixer is coupled to the reception terminal and used to mix the radio frequency signal with a first carrier signal for generating a first analog signal. The analog-to-digital converter is coupled to the mixer and used to generate a digital signal according to the first analog signal. The spectrum despread unit is coupled to the analog-to-digital converter and used to generate a spectrum despread signal according to the digital signal and a first spread vector. The processor is used to update the first spread vector according to the digital signal and generate the transmission data according to the spectrum despread signal.

Another embodiment provides a signal processing method for controlling a signal processing system to detect spatial information of a measured object. The signal processing system includes a transmission module, a reception module and a processor. The transmission module includes a spread spectrum unit, a digital-to-analog converter and a first mixer. The reception module includes a second mixer, an analog-to-digital converter and a spectrum despread unit. The method includes generating a spread spectrum signal by the spread spectrum unit according to a data signal and a first spread vector; generating a first analog signal by the digital-to-analog converter according to the spread spectrum signal; mixing the first analog signal and a first carrier signal for generating a transmission radio frequency signal by the first mixer; transmitting the transmission radio frequency signal by the transmission module for the transmission radio frequency signal to be reflected by a measured object to generate a reception radio frequency signal; mixing the reception radio frequency signal and a second carrier signal to generate a second analog signal by the second mixer; receiving the second analog signal and generating a digital signal according to the second analog signal by the analog-to-digital converter; generating a spectrum despread signal according to the digital signal and a second spread vector by the spectrum despread unit; and generating detection data corresponding to the spatial information of the measured object according to the spectrum despread signal by the processor.

DETAILED DESCRIPTION

Figure 1:
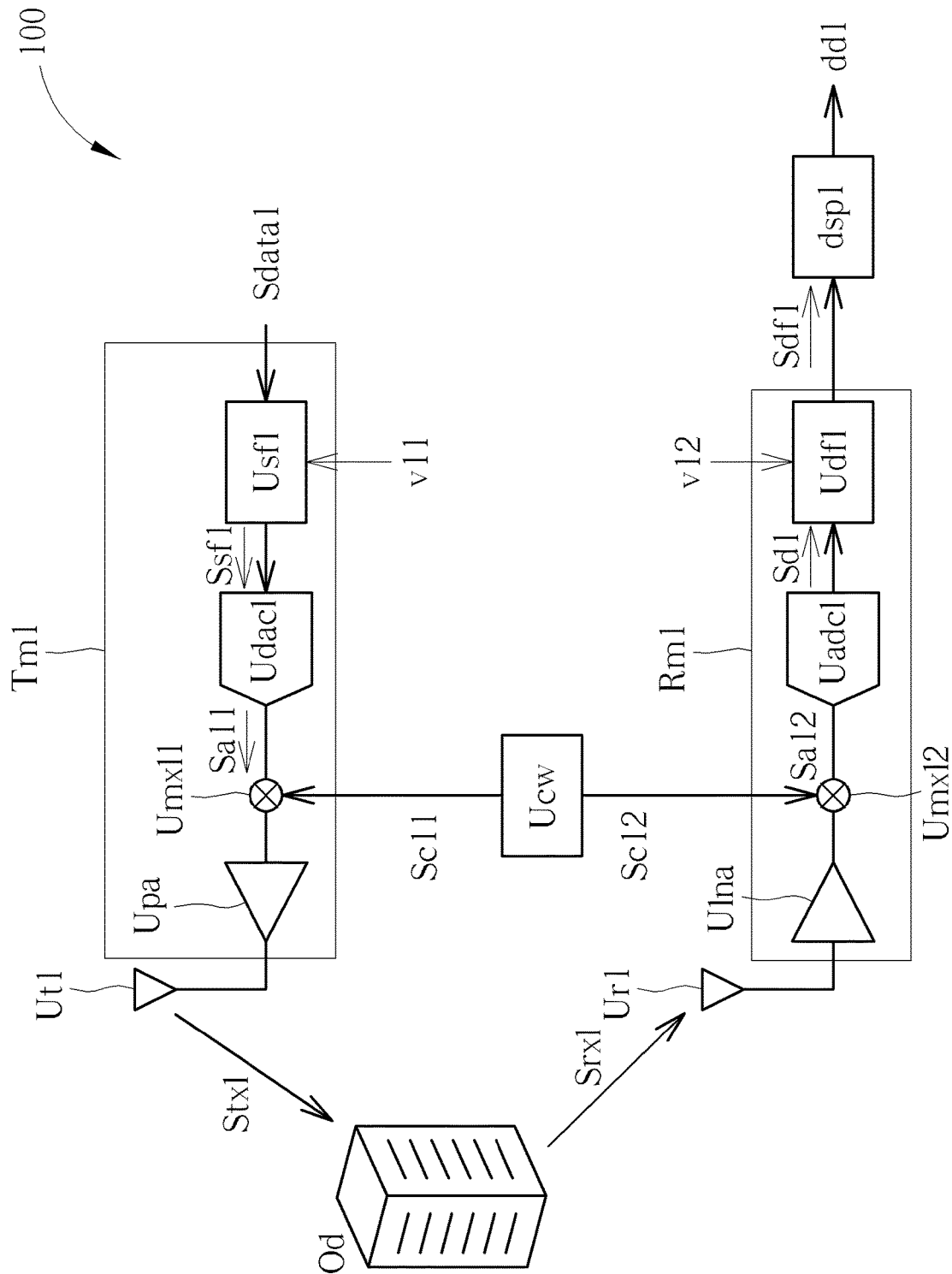
FIG. 1 illustrates a signal processing system according to an embodiment.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

FIG. 1 illustrates a signal processing system 100 according to an embodiment. The signal processing system 100 may include a transmission module Tm1, a reception module Rm1 and a processor dsp1. The transmission module Tm1 may be used to generate and transmit a transmission radio frequency (RF) signal Stx1 according to a data signal Sdata1 and a first spread vector v11. The transmission module Tm1 includes a spread spectrum unit Usf1, a digital-to-analog converter Udac1 and a mixer Umx11. The spread spectrum unit Usf1 may be used to generate a spread spectrum signal Ssf1 according to the data signal Sdata1 and the first spread vector v11. The digital-to-analog converter Udac1 is coupled to the spread spectrum unit Usf1 and used to generate an analog signal Sa11 according to the spread spectrum signal Ssf1. The mixer Umx11 is coupled to the digital-to-analog converter Udac1 and used to mix the analog signal Sa11 with a first carrier signal Sc11 to generate the transmission radio frequency signal Stx1. The transmission RF signal Stx1 may be transmitted via a transmission unit Ut1. A power amplifier Upa in FIG. 1 may be used to amplify the transmission RF signal Stx1. The processor(s) mentioned herein may be used to perform digital signal processing, such as computing processor(s), signal processing circuit(s) or digital signal processor(s).

The reception module Rm1 may despread the reception radio frequency signal Srx1 which originates from the transmission radio frequency signal Stx1 reflected by a measured object Od to be detected. That is, the reception module Rm1 may be used to receive a reception radio frequency signal Srx1 and a second spread vector v12 and generate a spectrum despread signal Sdf1. The reception radio frequency signal Srx1 may be generated by having the transmission radio frequency signal Stx1 reflected by a measured object Od, received via a reception unit Ur1 and amplified by a low noise amplifier Ulna after being received. The transmission unit Ut1 and the reception unit Ur1 may include antennae according to embodiments.

The reception module Rm1 may include a mixer Umx12, an analog-to-digital converter Udac1 and a spectrum despread unit Udf1. The mixer Umx12 may be coupled to the reception unit Ur1 and used to mix the reception radio frequency signal Srx1 with a second carrier signal Sc12 to generate an analog signal Sa12. The analog-to-digital converter Uadc1 may be coupled to the mixer Umx12 and used to generate a digital signal Sd1 according to the analog signal Sa12. The spectrum despread unit Udf1 may be coupled to the analog-to-digital converter Uadc1 and used to generate the spectrum despread signal Sdf1 according to the digital signal Sd1 and the second spread vector v12. The processor dsp1 may be used to conduct digital filtering and frequency-domain analysis/estimation so as to generate object detection data dd1 according to the spectrum despread signal Sdf1. The object detection data dd1 may be corresponding to spatial information of the measured object Od.

The reception RF signal Srx1 may be generated by having the transmission RF signal Stx1 reflected by the measured object Od. The spatial informal of the measured object Od may include a displacement of the measured object Od, a moving velocity of the measured object Od and/or a distance between the measured object Od and the signal processing system 100. The detection may be performed according to the Doppler effect. For example, if the measured object Od is a vehicle, its moving velocity may be detected. If the measured object Od is a human body, body movements caused by respiration may be detected for checking vital signs.

Figure 2:
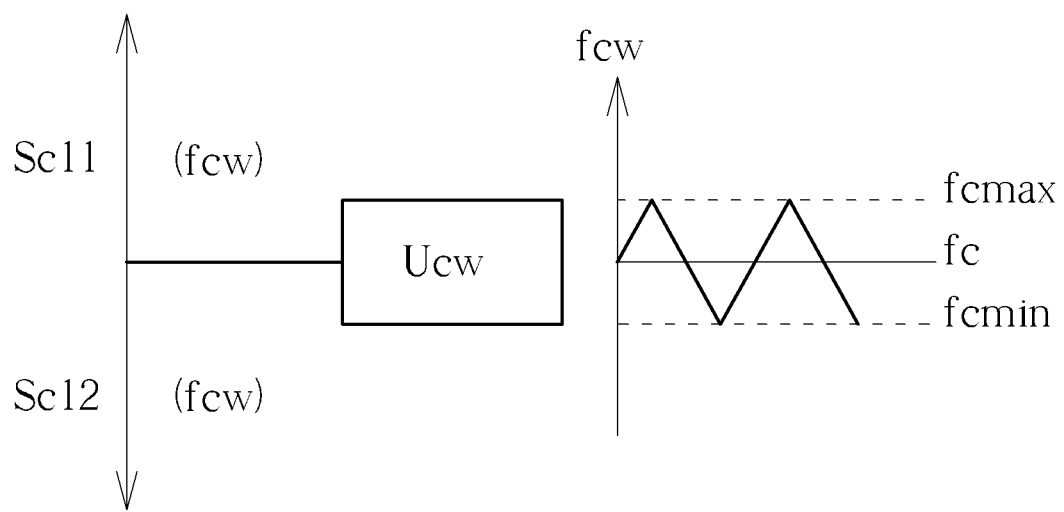
FIG. 2 illustrates the frequency of the first carrier signal and the second carrier signal according to an embodiment.

According to an embodiment, a carrier signal generator Ucw may be coupled to the mixers Umx11 and Umx12 and used to provide the first carrier signal Sc11 and the second carrier signal Sc12. Frequencies of the first carrier signal Umx11 and the second carrier signal Umx12 may be substantially identical as a frequency fcw. For example, the frequency fcw may be substantially fixed as a frequency fc. In another example, the frequency fcw may be unfixed as shown in FIG. 2. FIG. 2 illustrates a waveform diagram of the frequency fcw of the first carrier signal Sc11 and the second carrier signal Sc12. If the frequency fcw is unfixed, it may vary between a maximum fcmax and a minimum fcmin. The waveform may be of sawtooth wave, triangular wave or sine wave.

The reception RF signal Srx1 may be contaminated by the interference signal distributed in a first frequency band. In the spectrum despread signal Sdf1, the interference may be spread from the first frequency band to a second frequency band. The bandwidth of the second frequency band may be wider than the bandwidth of the first frequency band. Meanwhile, with Doppler shift caused by the motion of the measured object Od, the signal carrying information of the Doppler effect, which originates from the transmission RF signal Stx1, may be spectrum despread to a third frequency band. The bandwidth of the third frequency band may be narrower than the bandwidth of the second frequency band. By filtering out the wideband interference but preserving the narrowband signal carrying information of the Doppler effect in the spectrum despread signal Sdf1, the ratio of signal-to-interference may be increased as described below.

Figure 3:
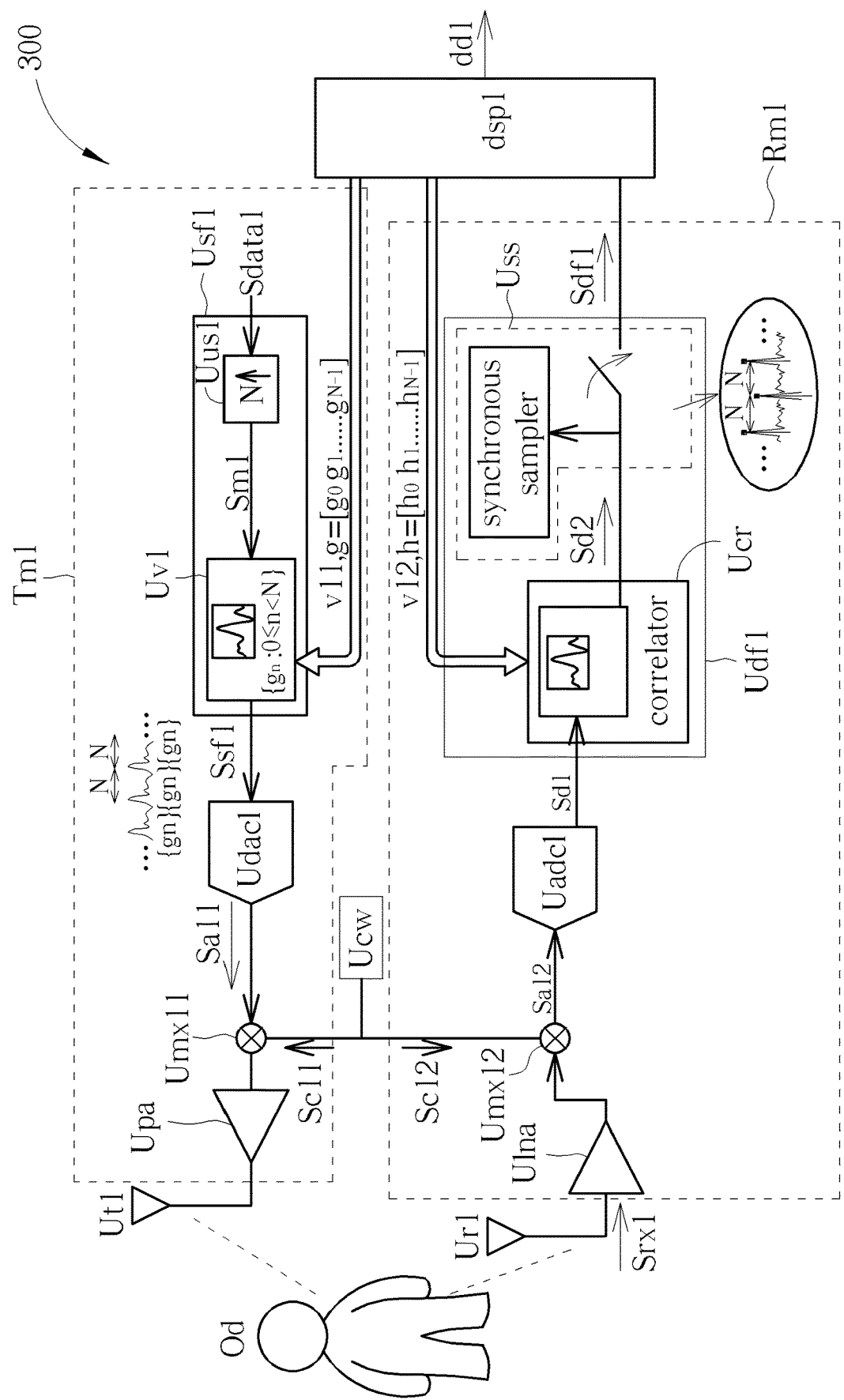
FIG. 3 illustrates a functional block diagram of a signal processing system according to an embodiment.

FIG. 3 illustrates a functional block diagram of a signal processing system 300 according to an embodiment. The signal processing system 300 may be an embodiment of the signal processing system 100. As shown in FIG. 3, the spread spectrum unit Usf1 may include an upsampling unit Uus1 and a spread vector unit Uv1. The upsampling unit Uus1 may be used to perform upsampling on the data signal Sdata1 to generate a modulated signal Sm1 with a sampling rate that is a chip rate $f_{chip}$. The spread vector unit Uv1 may be used to receive the modulated signal Sm1 and the first spread vector v11 and generate the spread spectrum signal Ssf1 accordingly.

Figure 4:
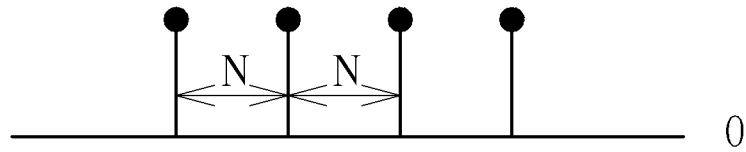
FIGS. 4-5 illustrate the modulated signal according to different embodiments.
Figure 5:
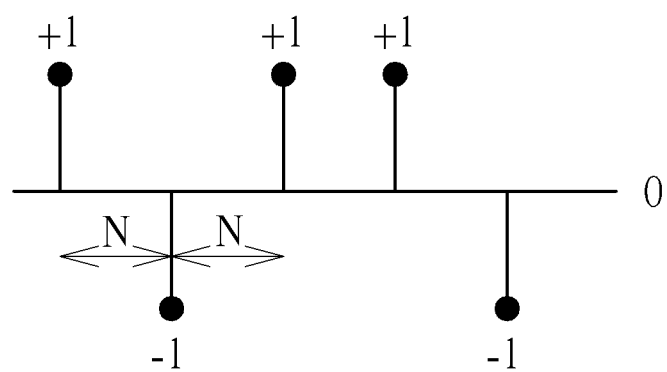

FIGS. 4-5 illustrate the modulated signal Sm1 according to different embodiments. According to an embodiment, the data signal Sdata1 could be data stream and may include a set of repeated identical symbols, and the modulated signal Sm1 as shown in FIG. 4. The modulated signal Sm1 may have identical pulses, and an interval between two pulses may be expressed as a parameter N.

According to another embodiment, the data signal Sdata1 may include numeral pulse amplitude modulation (PAM) symbols or binary phase shift keying (BPSK) symbols.

According to another embodiment, the signal processing system 300 may be used for transmission of Code Division Multiple Access (CDMA). As shown in FIG. 5, the data signal Sdata1 may be modulated into the modulated signal Sm1, and the spread spectrum signal Ssf1 may be of Direct-Sequence Spread Spectrum (DSSS). As shown in FIG. 5, the pulses may vary according to data being modulated, and an interval between two pulses may be expressed as a parameter N.

For example, Direct-Sequence Spread Spectrum code may be supported in FIG. 3. The upsampling unit Uus1 may increase the parameter N for performing upsampling. The first spread vector v11 may be expressed as a numeral vector $g=[g_0 \ g_1 \ldots g_{N-1}]$, and the second spread vector v12 may be expressed as a numeral vector $h=[h_0 \ h_1 \ldots h_{N-1}]$. The spectrum despread unit Usf1 may be operated with the chip rate $f_{chip}$. A function G may be used to express the spread vector unit Uv1 as $\{g_n: 0 \le n < N\}$ so that the waveform of the spectrum despread signal Ssf1 may be expressed as repeated waveforms $\{g_n\}$ arranged with the intervals N.

As shown in FIG. 3, the spectrum despread unit Udf1 may include a correlator Ucr and a synchronous sampler Uss. The correlator Ucr may be used to perform correlation calculation to generate a digital signal Sd2 according to the digital signal Sd1 and the second spread vector v12. The synchronous sampler Uss may be used to perform synchronous sampling on the digital signal Sd2 to generate the spectrum despread signal Sdf1.

As the embodiment of FIG. 3, the data signal Sdata1, the spread spectrum signal Ssf1, the digital signal Sd1, the digital signal Sd2 and the spectrum despread signal Sdf1 may correspond to the time index n, so the signals may be expressed as the data signal Sdata1(n), the spread spectrum signal Ssf1(n), the digital signal Sd1(n), the digital signal Sd2(n) and the spectrum despread signal Sdf1(n) respectively. The analog signal Sa11, the transmission RF signal Stx1, the reception RF signal Srx1 and the analog signal Sa12 may correspond to a continuous time variable t, so the signals may be expressed as the analog signal Sa11(t), the transmission RF signal Stx1(t), the reception RF signal Srx1(t) and the analog signal Sa12(t).

Figure 6:
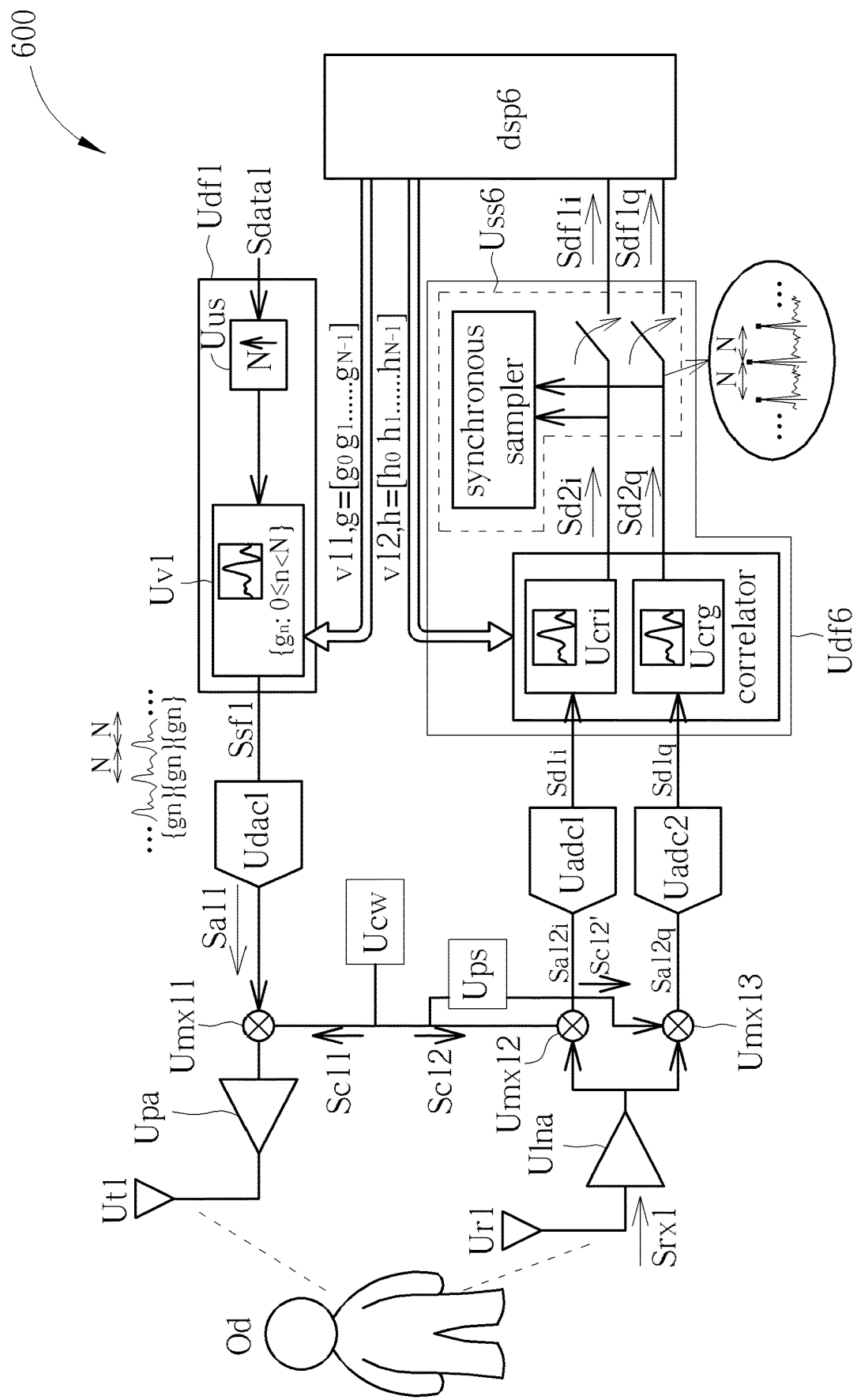
FIG. 6 illustrates a signal processing system according to another embodiment.

According to an embodiment, I/Q (In-phase and quadrature) signal processing may be supported. FIG. 6 illustrates a signal processing system 600 according to another embodiment. The signal processing system 600 may be similar to the signal processing system 300, and each of the reception RF signal Srx1, the analog signal Sa12, the digital signal Sd1 and the spectrum despread signal Sdf1 in FIG. 6 may include an I (In-phase) portion and a Q (quadrature) portion correspondingly. The signal processing system 600 may process and calculate the I portions and the Q portions of the signals. As shown in FIG. 6, an analog signal Sa12i, a digital signal Sd1i and a spectrum despread signal Sdf1i may be I portions, and an analog signal Sa12q, a digital signal Sd1q and a spectrum despread signal Sdf1q may be Q portions. The signal processing system 600 may further include a phase shifter Ups, a mixer Umx13 and an analog-to-digital converter Uadc2. The phase shifter Ups may be used to shift a phase of the second carrier signal Sc12 by an amount (e.g. 90 degrees) and generate a carrier signal Sc12'. The mixer Umx13 may be used to mix the second carrier signal Sc12 and the reception RF signal Srx1 being amplified by the amplifier Ulna so as to generate the analog signal Sa12q being a Q portion. The analog-to-digital converter Uadc2 may convert the analog signal Sa12q to a digital signal Sd1q. In the signal processing system 600, a spectrum despread unit Udf6 may include a correlator Ucri and a correlator Ucrq used to process the digital signals Sd1i and Sd1q for generating the digital signals Sd2i and Sd2q respectively. The spectrum despread unit Udf6 may include a synchronous sampler Uss6 used to perform synchronous sampling on the digital signals Sd2i and Sd2q to generate the spectrum despread signals Sdf1i and Sdf1q.

As shown in FIG. 6, the correlators Ucri and Ucrq are operated at the chip rate $f_{chip}$, and the coefficients may be expressed with a numeral sequence $\{h_n: 0 \le n < N\}$. The digital signals Sd2i and Sd2q are the sampled waveforms obtained by factor-N sub-sampling, and the sub-sampling interval may be expressed as the parameter N.

According to embodiments, when no interference exists or stochastic information of interference is unknown, the first spread vector v11 may be identical to the second spread vector v12 substantially. For example, the first spread vector v11 and the second spread vector v12 may be maximum length sequence (M-sequence) vectors. According to another embodiment, when interference exists or stochastic information of interference is known, the processor dsp1 may be further used to generate the second spread vector v12 or update the first spread vector v11 according to the stochastic characteristics of digital signal Sd1 so as to increase the robustness of combating the interference. According an embodiment, based on the received signals during the interference observation mode, at least one additional signal path may be set and coupled between the digital-to-analog unit Udac1 and the processor dsp1, so a spread vector generator in the processor dsp1 may generate the second spread vector v12 according to the digital signal Sd1 and update the first spread vector v11 according to the vector v12. According to another embodiment, the processor dsp1 may generate the second spread vector v12 according to the digital signal Sd1 and update the first spread vector v11 according to the second spread vector v12.

Regarding the first spread vector v11 and the second spread vector v12, the related calculations may be as described below. In an example shown in FIG. 3, during the interference observation mode, the processor dsp1 may convert (M+N) received digital signal samples of Sd1 from the additional signal path as a matrix U', and the matrix U' may be expressed as $U'=[u'_0 \ u'_1 \ u'_2 \ldots u'_{N-1}]$, where $u'_m=[u(m) \ u(m+1) \ldots u(m+M-1)]^T$ and u(n) is the Sd1. A transpose $U'^T$ of the matrix U' could be obtained. An eigenvector of the minimum eigenvalue of a product $(U'^T \cdot U')$ of the matrix U' and the transpose $U'^T$ may therefore be obtained. The second spread vector v12 may be generated according to the eigenvector, and a set of vectors $h'_{<0>}$ to $h'_{<N-1>}$ are obtained by circularly shifting the second spread vector v12 by 0 to N−1 element locations. A circulant matrix H' may be generated according to the set of vectors $h'_{<0>}$ to $h'_{<N-1>}$ using $H'=[h'_{<0>} \ h'_{<1>} \ldots h'_{<N-1>}]^T$. According to the circulant matrix H', the first spread vector v11 may be updated. The processor dsp1 may find the first spread vector v11, denoted as the vector g', so that the magnitude of an inner product of a first column vector $h'_{<0>}$ (same as the second spread vector v12) of the circulant matrix $[h'_{<0>} \ h'_{<1>} \ldots h'_{<N-1>}]$ and the vector g' is maximized. In other words, the vector g' maximizes $|h'^T_{<0>} \cdot g'|$ with the constraint $\|g'\|=1$. In addition, the unit vector g' also requires to minimize the magnitude of the inner products of the vector g' and the vector $h'_{<k>}$, where the vector $h'_{<k>}$ are column vectors of the circulant matrix $H'=[h'_{<0>}\ h'_{<1>} \ldots h'_{<N-1>}]$ except the first column vector. That is, the used column vectors are $h'_{<k>}$, for $k=1\ldots N-1$ and $k\neq 0$. In other words, the vector g' should also minimize $|h'_{<k>}{}^{T}\cdot g'|$, where $k\neq 0$, and $h'_{<k>}$ is the k location circularly shifted vector of the second spread vector v12. first spread vector The related equations may be described below. When calculating a vector (e.g. the second spread vector v12) at a reception terminal, the digital signal Sd1 may be expressed as u(n) to have the following equations. Under an interference observation window, N data vectors of size M (dim-M) may be formed as follows.

$$u'_0 = [u(0)u(1) \ldots u(M-1)]^T$$

$$u'_1 = [u(1)u(2) \ldots u(M)]^T$$

$$\ldots$$

$$u'_{N-1} = [u(N-1)u(N) \ldots u(N+M-1)]^T$$

The second spread vector v12 may be expressed as $h'=[h_0\ h_1 \ldots h_{N-1}]$. The vector h' may be chosen to be the unit vector which minimizes $\|U'\cdot h'\|^2$ where $U'=[u'_0\ u'_1\ u'_2 \ldots u'_{N-1}]$. The solved vector h' may be an eigenvector of the minimum eigenvalue of a rectangular matrix $(U'^T\cdot U')$, and the second spread vector v12 may be obtained accordingly.

Afterward, a vector used for spread spectrum at a transmission terminal, that is the first spread vector v11, may be obtained as follows. The first spread vector is denoted as the vector g'.first spread vector Circularly shifted vectors may be formed as follows.

$$h'_{<k>} = [h_{(N-k)\bmod N}\ h_{(N-k+1)\bmod N} \ldots h_{(N-k-1)\bmod N}]^T,$$
wherein $k=0,1,\ldots,N-1$, and "mod" means "modulo operation".

A circular shift matrix H' may be expressed as:

$$H' = [h'_{<0>}\ h'_{<1>} \ldots h'_{<N-1>}]^T$$

where $h'_{<0>}=h'$, and h' is the first column vector of the matrix H'. The vector g may be resolved by find the optimal vector which minimizes the following cost function with the constraint $\|g'\|=1$. The cost function is given as $$E(g') = \Sigma_{k=1,2,\ldots,N-1}|h'_{<k>}{}^T\cdot g'| - \beta\cdot|h'_{<0>}{}^T\cdot g'|, \text{ where } \beta \text{ is a weight parameter.}$$

The matrix G denotes a circulant matrix with a first column being the vector g'. The above optimization may be interpreted as finding the vector g and a large scalar such that $$H'^T\cdot G \approx \alpha\cdot I;$$

where the scalar $\alpha$ should be as large as possible.

In summary, the vector g' may be obtained by solving the described optimization, and the first spread vector v11 may be obtained accordingly. The format of the first spread vector v11 and the second spread vector v12 may include numeral pulse amplitude modulation (PAM) symbols or binary phase shift keying (BPSK) symbols.

Figure 7:
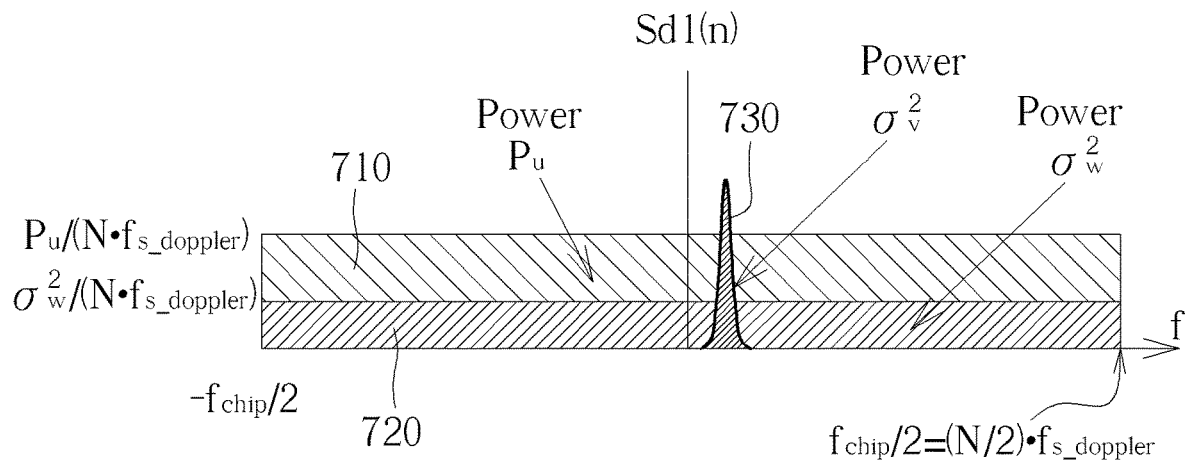
FIGS. 7-9 illustrate signals in frequency spectrum according to an embodiment.
Figure 8:
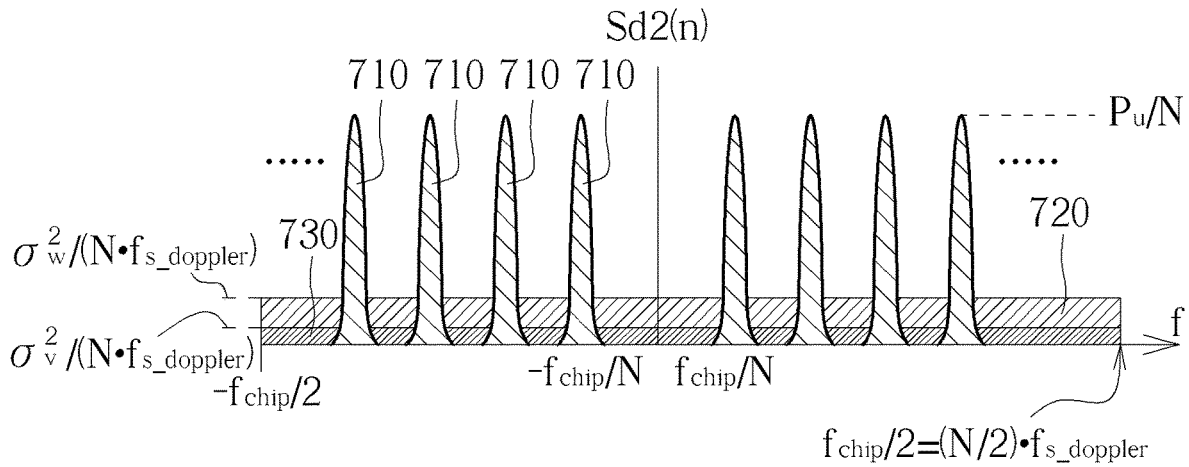
Figure 9:
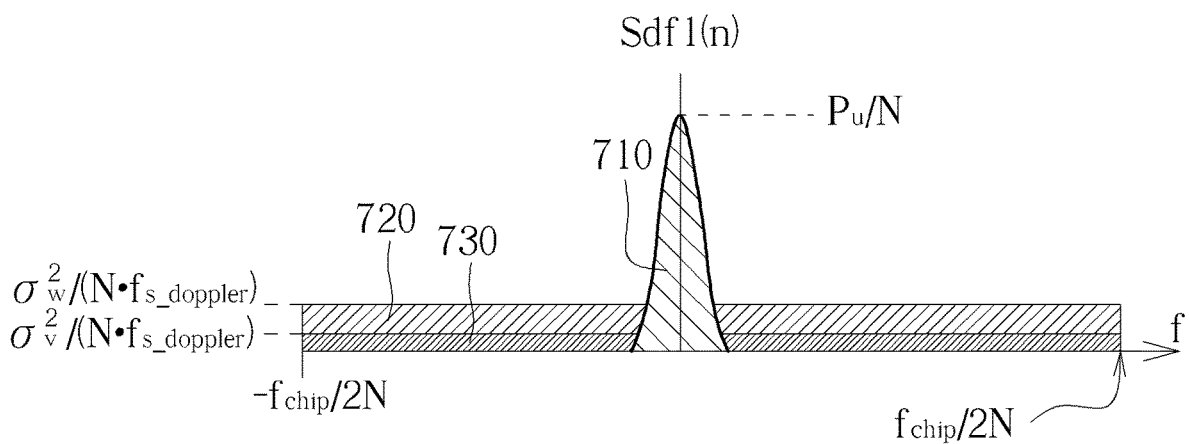

FIGS. 7-9 illustrate signals' spectrums of a signal processing system according to an embodiment. FIGS. 7-9 are drawn in frequency domain. FIGS. 7, 8 and 9 may be respectively corresponding to spectrums of the digital signal Sd1, digital signal Sd2 and the spectrum despread signal Sdf1. As mentioned above, these signals may be expressed as Sd1(n), Sd2(n) and Sdf1(n) respectively. In the example of FIG. 3, after Doppler shift caused by the motion of the measured object Od, the signal carrying information of the Doppler effect, which is related to the spectrum despread signal Ssf1 originated from the transmission RF signal Stx1, may be distributed in an area 710 on the spectrum as shown in FIG. 7. Background noise may be distributed in an area 720. A band-limited Interference may be distributed in an area 730. As shown in FIG. 8 and FIG. 3, after being processed by the correlator Ucr, the signal carrying information of the Doppler effect may be distributed from the area 710 to form multiple spectral components. The interference in the area 730 may be distributed as FIG. 8. As shown in FIG. 9, the signal of the area 710 may be gathered to a low frequency band after synchronous sub-sampling. Hence, the information of the area 710 may be captured by filtering, and the detecting information of the measured object Od may be obtained. As shown in FIG. 7, power of the area 710 may be $P_u$, power of the area 720 may be $\sigma_w^2$, and power of the interference (of the area 730) may be $\sigma_v^2$. A left Nyquist boundary and a right Nyquist boundary may be $\pm f_{chip}/2 = (N/2)\cdot f_{s\_doppler}$, wherein $f_{chip}$ may be the aforementioned chip rate, and N may be the parameter N mentioned in FIG. 4 or FIG. 5. A height (in unit of power per Hz) of the area 720 may be $\sigma_w^2/(N\cdot f_{s\_doppler})$, and a height of the area 710 may be $P_u/(N\cdot f_{s\_doppler})$. As shown in FIG. 8, the signal carrying information of the Doppler effect may be distributed from the area 710 to form multiple spectral components, spectral component of a lower frequency band may be at $f_{chip}/N$, and a height of a pulse may be $P_u/N$. As shown in FIG. 8, the height of the area 730 may be decreased to be $\sigma_v^2/(N\cdot f_{s\_doppler})$. As shown in FIG. 9, after gathering the signal of the area 710, the height may be $P_u/N$. Since the interference of the area 730 has been spread, most energy of the interference has been removed by filter. In other words, in the spectrum despread signal, the interference may be spectrally spread from a narrow band (a first frequency band) to a wider band (a second frequency band) such as the entire frequency band, and the signal carrying information of the Doppler effect may be spectrally spread from a wider band (a second frequency band) such as the entire frequency band to a narrow band (a third frequency band). Hence, the power spectrum density of the interference in the first frequency band may be reduced obviously. According to a processing flow shown in FIG. 7 to FIG. 9, the interference of a specific frequency band may be reduced effectively according to an embodiment.

Figure 10:
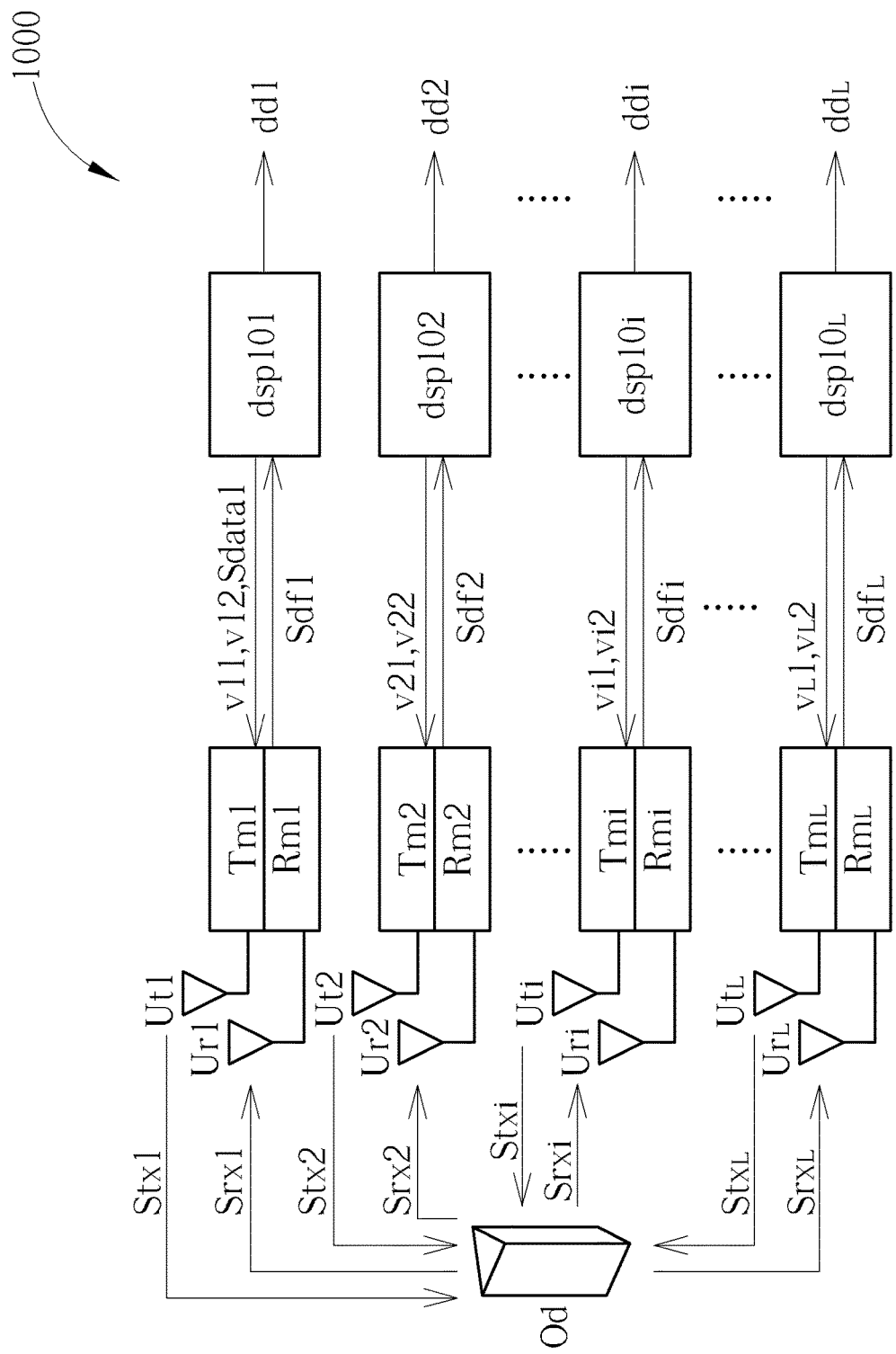
FIG. 10 illustrates a signal processing system including a plurality of transmission modules and reception module according to another embodiment.

FIG. 10 illustrates a signal processing system 1000 including a plurality of transmission modules and reception module according to another embodiment. The signal processing system 1000 may include a transmission module Tm1 and a reception module Rm1, a transmission module Tm2 and a reception module Rm2, . . . , a transmission module Tmi and a reception module Rmi, . . . and a transmission module $Tm_L$ and a reception module $Rm_L$ that include L sets of transmission modules and reception modules. The parameter L may be a positive integer larger than 1. The set of the transmission module Tmi and the reception module Rmi (where $1 \leq i \leq L$) may act as a front end unit for performing microwave detection, and may be coupled to a corresponding processor dsp10i. Hence, the signal processing system 1000 may include L front end units and L processors, and an $i_{th}$ front end unit may be coupled to a transmission unit Uti and a reception unit Uri. Take the transmission module Tm2 and the reception module Rm2 as an example. The transmission module Tm2 may generate and transmit a transmission RF signal Stx2 according to a data signal (e.g. the data signal Sdata1 of FIG. 3) and a spread vector v21. The transmission module Tm2 may receive the reception RF signal Srx2. The reception RF signal Srx2 may be corresponding to the transmission RF signal Stx2, and the spread vector v21 may be orthogonal to the first spread vector v11. The spread vector v22 may be used for spectrum despread calculation of the reception RF signal Srx2. Regarding the relationship between the vectors v21 and v22, the aforementioned relationship between the first spread vector v11 and the second spread vector v12 may be referred to. Similarly, a spread vector $v_L1$ may be used for frequency spread calculation, and the spread vector $v_L1$ may be used for spectrum despread calculation. The mentioned vectors v11, v21 . . . $v_L1$ may have a format including a numeral PAM symbol or a BPSK symbol such as a {+1, −1} format.

Figure 11:
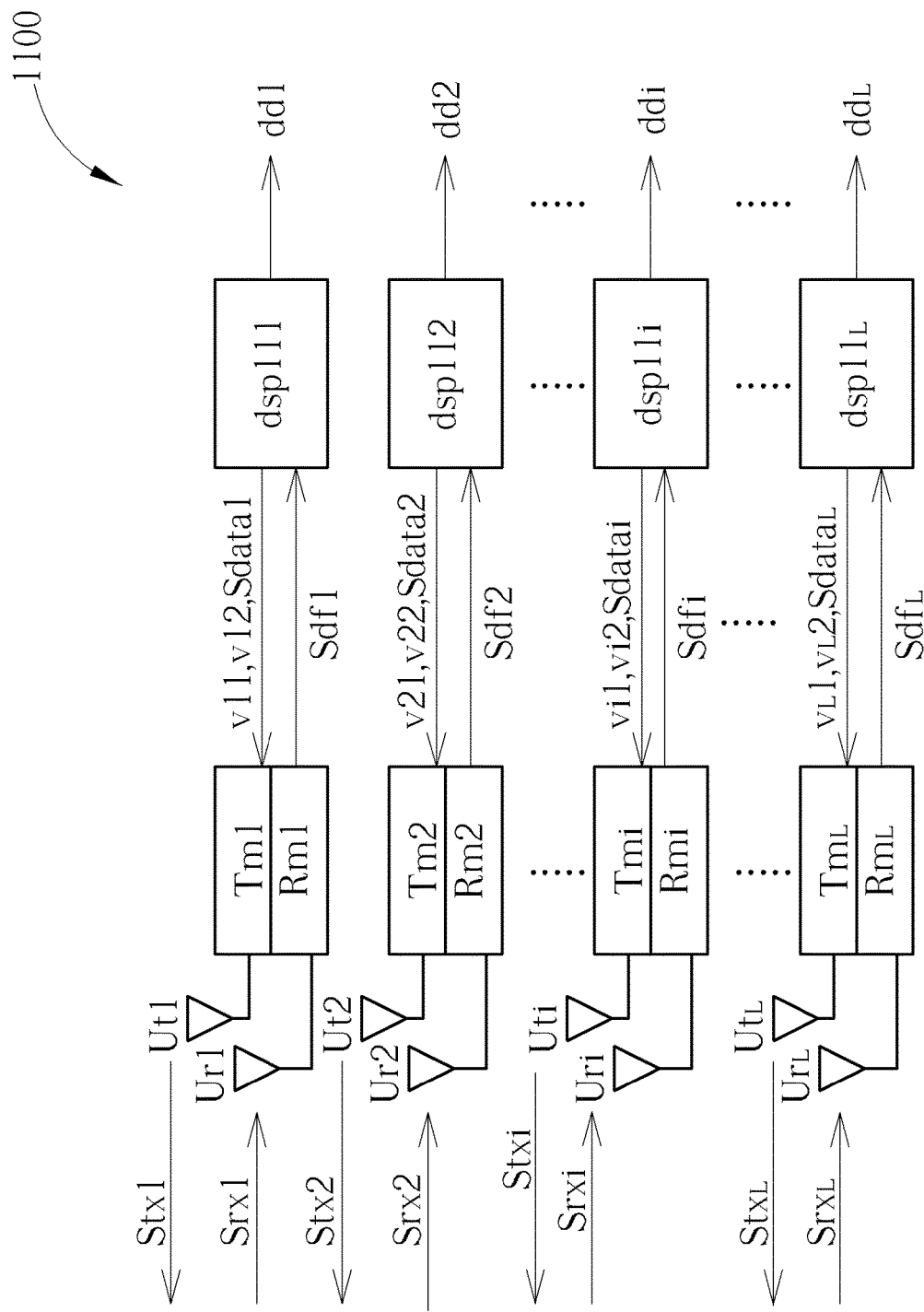
FIG. 11 illustrates a signal processing system including a plurality of transmission modules and reception modules according to another embodiment.

FIG. 11 illustrates a signal processing system 1100 including a plurality of transmission modules and reception modules according to another embodiment. FIG. 11 may be similar to FIG. 10, and processors dsp111 to dsp11L may provide the data signals Sdala1 to $Sdata_L$ to the transmission modules Tm1 to $Tm_L$ respectively for generating the transmission RF signals Stx1 to $Stx_L$. An $i_{th}$ spread vector vi1 (i≠1) may be orthogonal to the first spread vector v11. After being processed, the reception modules Rm1 to $Rm_L$ may output the spectrum despread signals Sdf1 to $Sdf_L$ respectively. According to an embodiment, the processor $dsp11_L$ may obtain the spatial information of the measured object Od according to the spectrum despread signals Sdf1 to $Sdf_L$. According to another embodiment, the processors dsp111 or dsp11i may obtain the spatial information of the measured object Od according to the spectrum despread signals Sdf1 to $Sdf_L$.

According to another embodiment, as shown in FIG. 11, the processor dsp11L may be a master processor and other processors may be slave processors. The processors dsp111-dsp11(L−1) may transmit the detection data dd1-*dd*(L−1) to the processor dsp11L. The $L_{th}$ processor dsp11L may obtain the spatial information of the object Od according to the detection data dd1-ddL and physical positions of the antennae Ut1/Ur1 to UtL/UrL. The processors dsp111-dsp11 may be linked to one another via wires or wirelessly.

Figure 12:
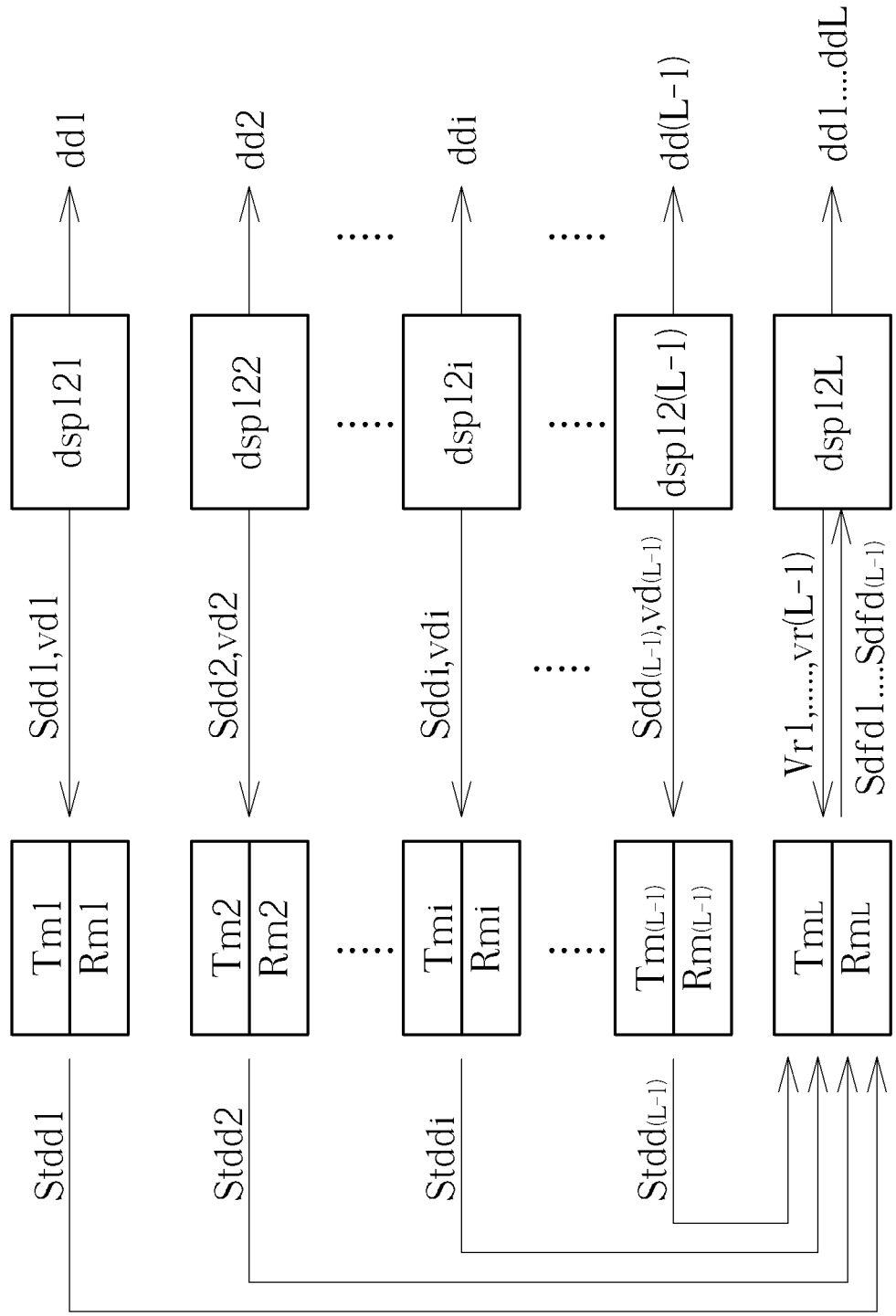
FIG. 12 illustrates operation of processors of a signal processing system according to another embodiment.

FIG. 12 illustrates operation of processors of a signal processing system according to another embodiment. A first processor dsp121 to an $L_{th}$ processor dsp12L are shown in FIG. 12. Each of the processors dsp121-12L may be used with a transmission unit and a reception unit as shown in FIG. 10 or FIG. 11. The processors dsp121-12(L−1) may load the detection data dd1-*dd*(L−1) into detection data signals Sdd1-$Sdd_{(L-1)}$ respectively. The transmission modules Tm1-Tm(L−1) may be used to generate and transmit data RF signals Stdd1-$Stdd_{(L-1)}$ according to the detection data signals Sdd1-$Sdd_{(L-1)}$ and data transmission vectors vd1-$vd_{(L-1)}$ respectively. The data RF signals Stdd1-$Stdd_{(L-1)}$ may be DSSS data RF signals. The reception module $Rm_L$ may be used to receive the data RF signals Stdd1-$Stdd_{(L-1)}$ and generate spectrum despread signals Sdfd1-$Sdfd_{(L-1)}$ according to data reception vectors vr1-*vr*(L−1). The processor dsp12L may generate the detection data dd1-ddL according to the spectrum despread data signals Sdfd1-$Sdfd_{(L-1)}$. In the example of FIG. 12, the $L_{th}$ processor dsp12L is the master processor, however, another processor may be used as the master processor in another example. For example, when the first processor dsp121 is the master processor, the first processor dsp121 may receive the second data RF signal to the $L_{th}$ data RF signal from the second processor dsp122 to the $L_{th}$ processor dsp12L, and generate spectrum despread data signals and the detection data dd1-$dd_L$ according to a set of reception vectors.

Figure 13:
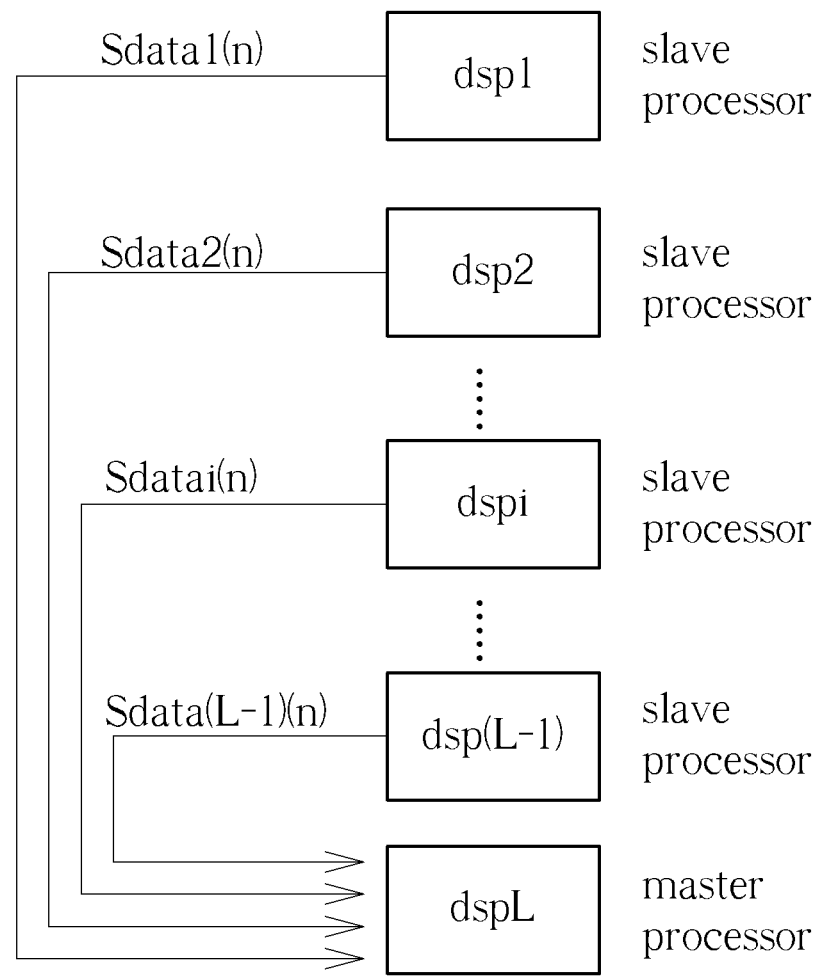
FIG. 13 illustrates operation of processors according to another embodiment.

FIG. 13 illustrates operation of processors according to another embodiment. As shown in FIG. 13, processors dsp1-dsp(L−1) may be slave processors, and a processor dspL may be a master processor. As transmitted data, the obtained detection data dd1-*dd*(L−1), which may be object detection information data, may be loaded into the data signals Sdata1-Sdata(L−1) by the processors dsp1-dsp(L−1) respectively and be transmitted to the master processor dsp L according to aforementioned DSSS wireless transmission. The displacement, the distance and the velocity related to the measured object Ob may be estimated. For example, the displacement may be caused by vital signs or heartbeats. The distance may be between the measured object and the signal processing system. The velocity may be a moving velocity of the measured object. The mentioned variables i and L may be positive integers, and 1≤i≤L. In FIG. 13, it is merely an example to regard the $L_{th}$ processor as a master processor. According to another embodiment, one of the processors dsp1-dspL may be used as a master processor, and other processors may be used as slave processors. For example, it is allowed to load the detection data dd2-ddL into data signals for being transmitted to the first processor dsp1 so as to obtain the spatial information of the measured object according to physical positions of the antennae.

Figure 14:
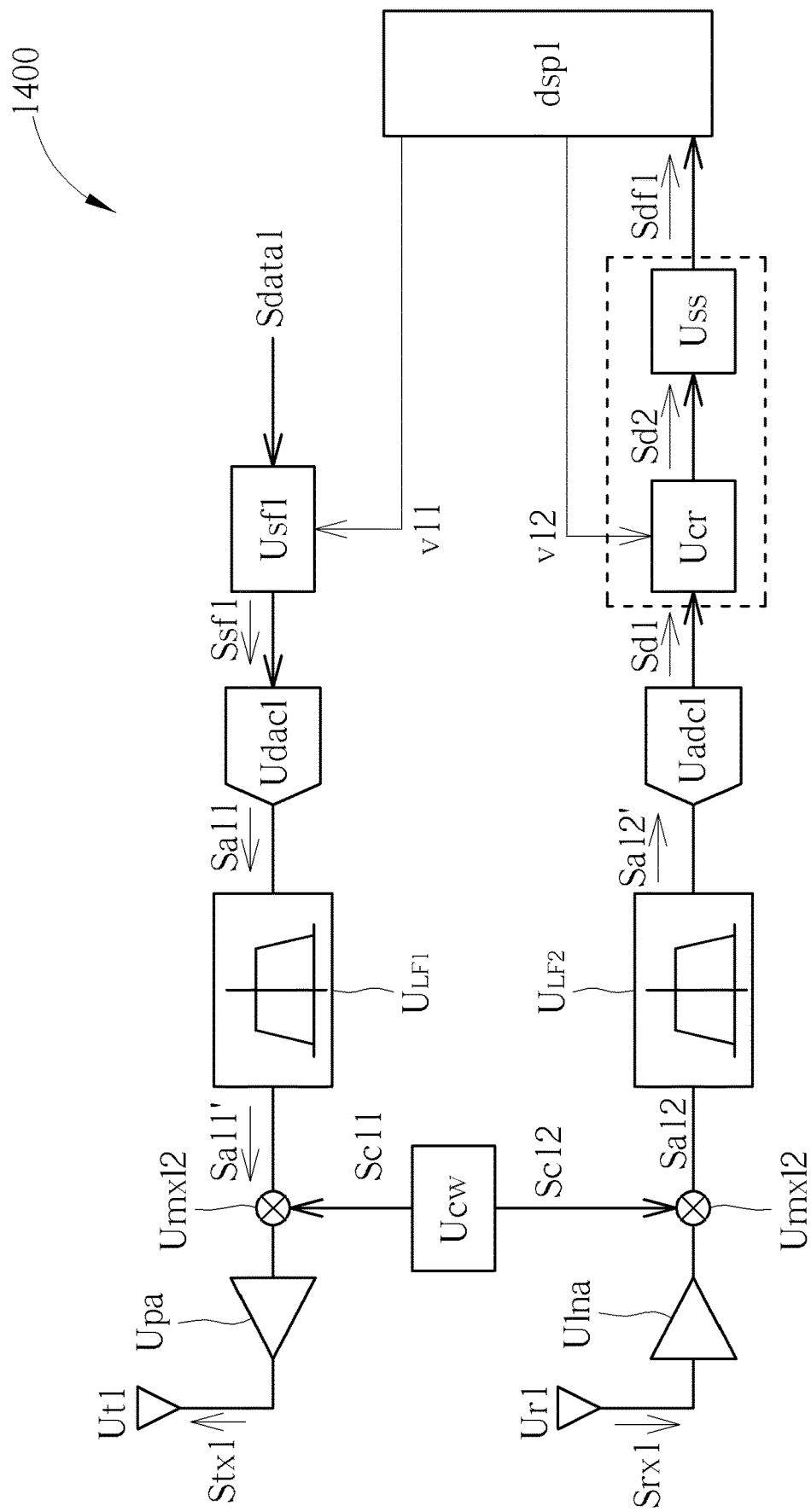
FIG. 14 illustrates a signal processing system according to another embodiment.

FIG. 14 illustrates a signal processing system 1400 according to another embodiment. The signal processing system 1400 may be similar to the signal processing system 300, and the similarities are not described repeatedly. The signal processing system 1400 may include low-pass filters $U_{LF1}$ and $U_{LF2}$. The low-pass filter $U_{LF1}$ may be coupled between the digital-to-analog converter Udac1 and the mixer Umx11 to capture a low frequency portion Sa11' of the analog signal Sa11. The low-pass filter $U_{LF2}$ may be coupled between the Umx12 and the analog-to-digital converter Uadc1 to capture a low frequency portion Sa12' of the analog signal Sa12.

The digital-to-analog converter Udac1 may have a ΣΔ modulation function to increase a dynamic range in a frequency band of operation.

Figure 15:
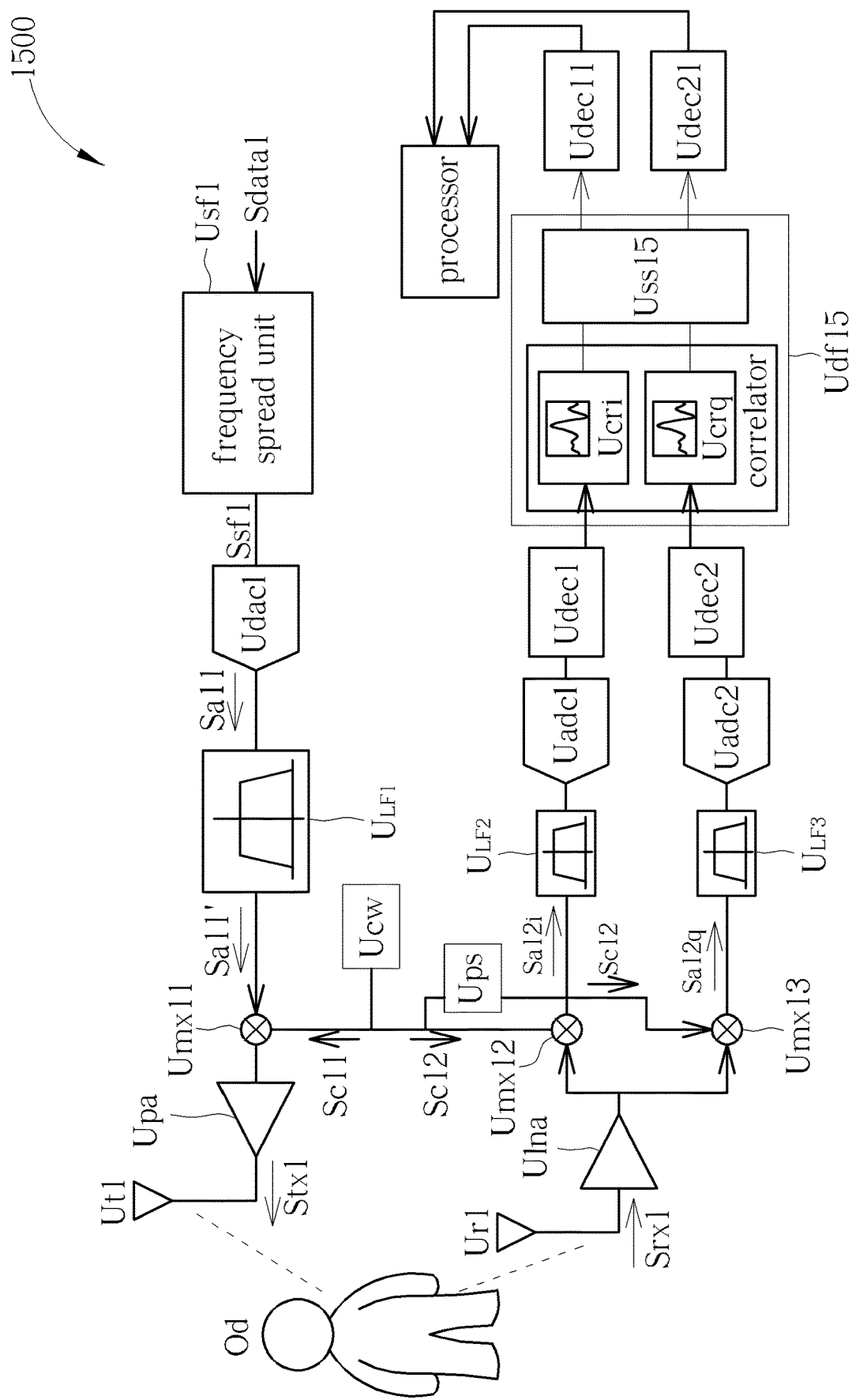
FIG. 15 illustrates a signal processing system according to another embodiment.

FIG. 15 illustrates a signal processing system 1500 according to another embodiment. FIG. 15 may be similar to FIG. 14 and FIG. 6. The signal processing system 1500 may be used to process I (In-phase) portions and Q (quadrature) portions of signals. Since a path of Q portions is included, FIG. 15 may further include a low-pass filter $U_{LF3}$. Moreover, as shown in FIG. 15, the signal processing system 1500 may have decimation filters Udec1 and Udec2 used for reducing sample rates and coupled between the analog-to-digital unit Uadc1 and the correlator Ucri and between the analog-to-digital unit Uadc2 and the correlator Ucrq respectively. After being processed by the synchronous sampler Uss15, the I portions and the Q portions may be sent to the decimation filters Udec11 and Udec21 respectively to be processed and then sent to a following processor.

Figure 16:
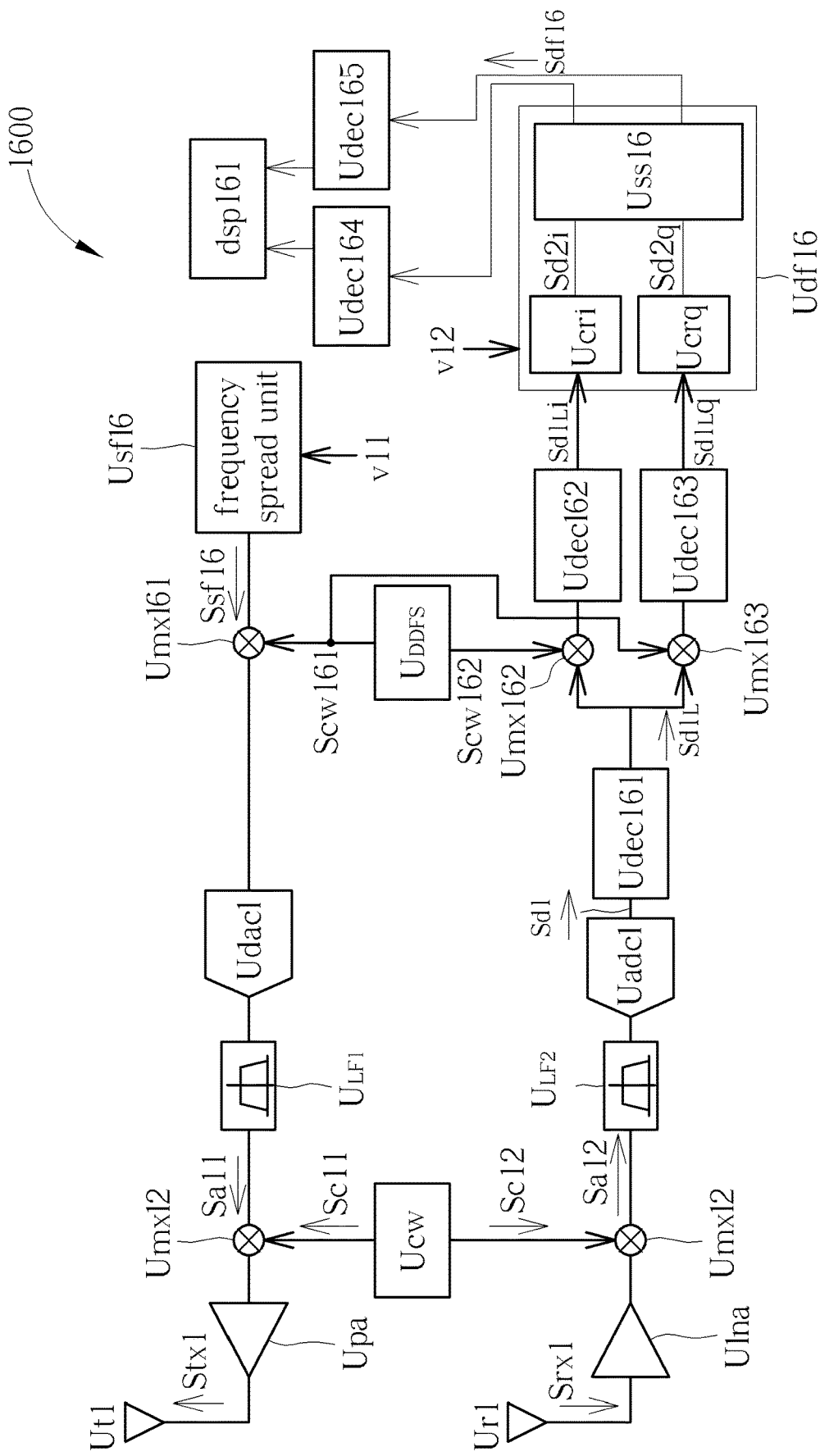
FIG. 16 illustrates a signal processing system according to another embodiment.

FIG. 16 illustrates a signal processing system 1600 according to another embodiment. In the signal processing system 1600, the functional blocks similar to units described above are not described repeatedly. The signal processing system 1600 may further include a digital mixer Umx161 coupled to a spread spectrum unit Usf16 to mix a spread spectrum signal Ssf16 and an internal carrier Scw161 to shift the frequency of the transmission RF signal Stx1 to an intermediate frequency $f_{IF}$ for reducing flicker noise. The internal carrier Scw161 may be corresponding to the intermediate frequency $f_{IF}$ and be expressed as sin ($2\pi n f_{IF}/f_{chip}$), where $f_{chip}$ may be the foresaid chip rate. The signal processing system 1600 may have a digital direct frequency synthesizer $U_{DDFS}$ coupled to the digital mixer Umx161 and used to provide the internal carrier Scw161. The digital-toanalog unit Udac1 may have a ΣΔ modulation function. For example, the mentioned flicker noise may be low frequency flicker noise occurring at complementary metal-oxide-semiconductor (CMOS) transistors of an RF front end of the reception unit Ur1.

The spectrum despread unit Udf16 of the signal processing system 1600 may include the correlators Ucrq and Ucri and a synchronous sampler Uss16. The correlator Ucrq may generate a digital signal Sd2q according to the second spread vector v12 and the digital signal Sd1. As the example of FIG. 16, the digital signal Sd1 may be processed by a decimation filter Udec161, a digital mixer Umx163 and another decimation filter Udec163 to generate the digital signal $Sd1_Lq$ to be sent to the correlator Ucrq. The correlator Ucrq may therefore generate a digital signal Sd2q according to the second spread vector v12 and the digital signal $Sd1_Lq$. The correlator Ucri may generate a digital signal Sd2i according to the second spread vector v12 and the digital signal Sd1. As shown in FIG. 16, the digital signal Sd1 may be processed by a decimation filter Udec161, a digital mixer Umx162 and another decimation filter Udec162 to generate the digital signal $Sd1_Li$ to be sent to the correlator Ucri for the correlator Ucri to generate the digital signal Sd2i according to the second spread vector v12 and the digital signal $Sd1_Li$. The synchronous sampler Uss16 may perform synchronous sampling on the digital signals Sd2q and Sd2i to generate a set of spectrum despread signals Sdf16. The signal processing system 1600 may include a digital mixer Umx163 coupled to the digital direct frequency synthesizer $U_{DDFS}$ and coupled between the analog-to-digital converter Uadc1 and the correlator Ucrq to mix the digital signal Sd1 and the internal carrier Scw161 to transmit a Q portion of the digital signal Sd1 into the correlator Ucrq. The decimation filter Udec161 may be optionally used and coupled between the analog-to-digital converter Uadc1 and the digital mixer Umx163 to transmit a low-frequency portion $Sd1_L$ of the digital signal Sd1 into the digital mixer Umx163. The decimation filter Udec163 may be coupled between the digital mixer Umx163 and the correlator Ucrq to process a Q portion of the digital signal Sd1 and then send the Q portion to the correlator Ucrq.

As shown in FIG. 16, the digital direct frequency synthesizer $U_{DDFS}$ may be further used to provide an internal carrier Scw162. The signal processing system 1600 may include a mixer Umx162 coupled to the digital direct frequency synthesizer $U_{DDFS}$ and coupled between the analog-to-digital converter Uadc1 and the correlator Ucri to mix the digital signal Sd1 and the internal carrier Scw162 for transmitting an I portion of digital signal Sd1 to the correlator Ucri. The internal carrier Scw162 may be expressed as cos ($2\pi n f_{IF}/f_{chip}$). According to an embodiment, when the signal processing system 1600 includes the decimation filter Udec161, the decimation filter Udec161 may be coupled between the analog-to-digital converter Uadc1 and the digital mixer Umx162 to transmit a low-frequency portion $Sd1_L$ of the digital signal Sd1 to the digital mixer Umx162. According to an embodiment, the signal processing system 1600 may include a decimation filter Udec162 coupled between the digital mixer Umx162 and the correlator Ucri to process an I portion of the digital signal Sd1 and then send the I portion to the correlator Ucri.

As shown in FIG. 16, the signal processing system 1600 may further include the decimation filters Udec164 and Udec165. The decimation filters Udec164 may be coupled to the synchronous sampler Uss16 and a processor dsp161 to transmit a low-frequency portion of the I portion of the sampled spectrum despread signal Sdf16 to the processor dsp161. The decimation filters Udec165 may be coupled to the synchronous sampler Uss16 and a processor dsp161 to transmit a low-frequency portion of the Q portion of the sampled spectrum despread signal Sdf16 to the processor dsp161. The processor dsp161 may obtain the information of the measured object accordingly.

Figure 17:
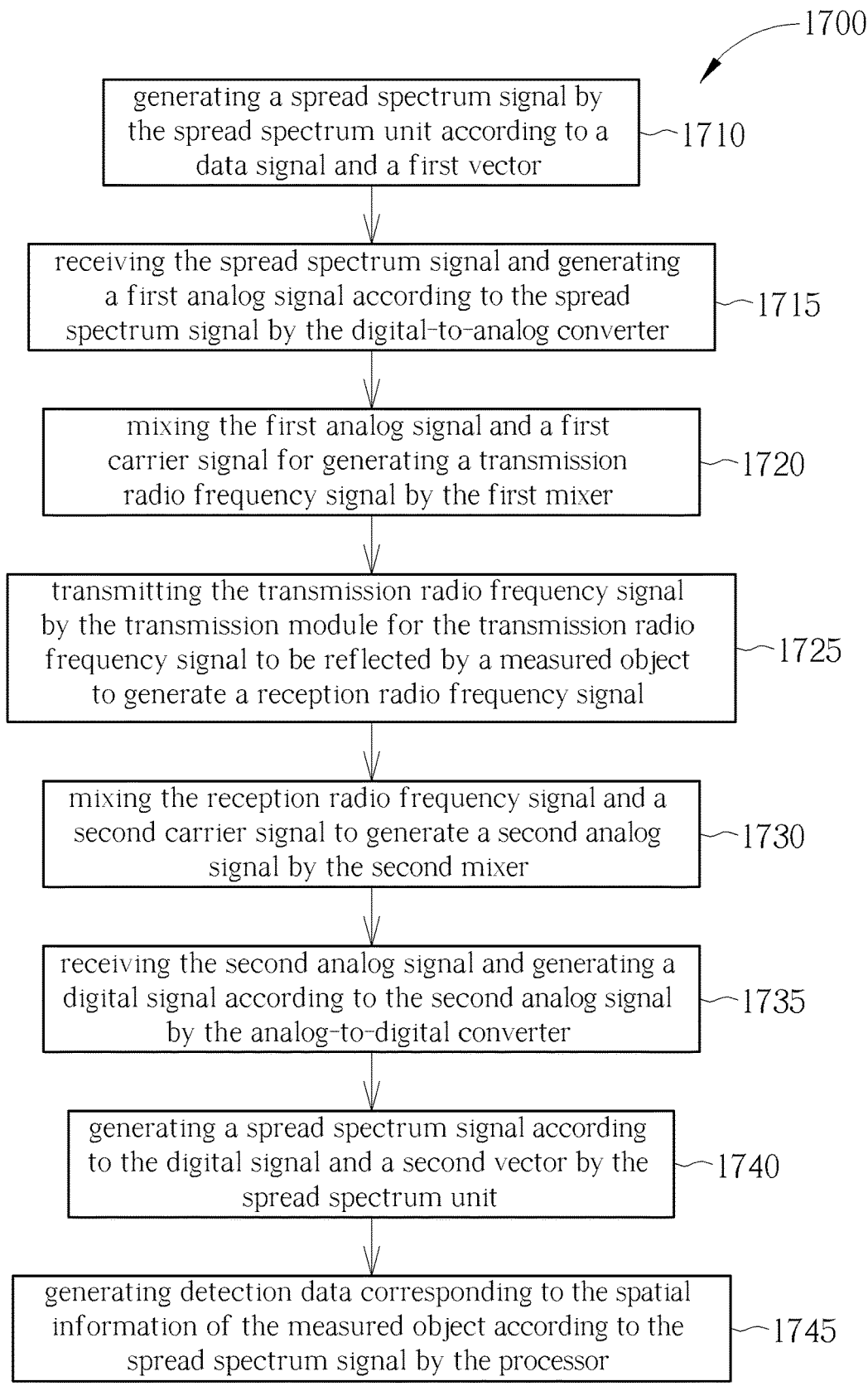
FIG. 17 illustrates a flowchart of a signal processing method according to an embodiment.

FIG. 17 illustrates a flowchart of a signal processing method 1700 according to an embodiment. The signal processing method 1700 may be used to control the signal processing system 100 of FIG. 1 and include the following steps.

Step 1710: generating the spread spectrum signal Ssf1 by the spread spectrum unit Usf1 according to the data signal Sdata1 and the first spread vector v11;

Step 1715: receiving the spread spectrum signal Ssf1 and generating the analog signal Sa11 according to the spread spectrum signal Ssf1 by the digital-to-analog converter Uadc1;

Step 1720: mixing the analog signal Sa11 and the carrier signal Sc11 for generating the transmission radio frequency signal Stx1 by the mixer Umx11;

Step 1725: transmitting the transmission radio frequency signal Stx1 by the transmission module Tm1 for the transmission radio frequency signal Stx1 to be reflected by the measured object Od to generate a reception radio frequency signal Srx1;

Step 1730: mixing the reception radio frequency signal Srx1 and the carrier signal Sc12 to generate the analog signal Sa12 by the mixer Umx12;

Step 1735: receiving the analog signal Sa12 and generating the digital signal Sd1 according to the analog signal Sa12 by the analog-to-digital converter Uadc1;

Step 1740: generating the spectrum despread signal Sdf1 according to the digital signal Sd1 and the second spread vector v12 by the spectrum despread unit Udf1;

Step 1745: generating the detection data dd1 corresponding to the spatial information of the measured object Od according to the spectrum despread signal Sdf1 by the processor dsp1.

According to a signal processing system disclosed in an embodiment, a displacement, a distance and/or a velocity related to a measured object may be obtained. A transmission unit of a signal processing system may transmit a signal for a reception unit of another signal processing system to receive the signal for wireless communications. For example, an aforementioned reception unit (e.g. an antenna) of a reception module may receive an RF signal comprising transmission data, and a mixer, an analog-to-digital converter and a spectrum despread unit may be used to process the received RF signal to generate a spectrum despread signal. The RF signal may be modulated/encoded from the transmission data. A processor may therefore obtain/recover the transmission data, and wireless communications may be performed. According to an embodiment, those modules/units above could be implement by corresponding circuits. According to an embodiment, data transmission through CDMA technique may be supported. According to a signal processing system disclosed in an embodiment, the engineering shortcomings may be overcome. Interference may be better suppressed, and detection accuracy may be improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A signal processing system comprising:
a first transmission module configured to generate and transmit a first transmission radio frequency signal according to a first data signal and a first spread vector, the first transmission module comprising:
a first spread spectrum unit configured to generate a spread spectrum signal according to the first data signal and the first spread vector, wherein the first spread spectrum unit comprises:
a first upsampling unit configured to perform upsampling on the first data signal to generate a first modulated signal; and
a first spread vector unit configured to receive the first modulated signal and the first spread vector and generate the spread spectrum signal accordingly;
a first digital-to-analog converter coupled to the first spread spectrum unit and configured to generate a first analog signal according to the spread spectrum signal; and
a first mixer coupled to the first digital-to-analog converter and configured to mix the first analog signal with a first carrier signal to generate the first transmission radio frequency signal; and
a first reception module configured to receive a first reception radio frequency signal and a second spread vector and generate a spectrum despread signal wherein the first reception radio frequency signal is generated by having the first transmission radio frequency signal reflected by a measured object, the first reception module comprising:
a second mixer configured to mix the first reception radio frequency signal with a second carrier signal to generate a second analog signal;
a first analog-to-digital converter coupled to the second mixer and configured to generate a first digital signal according to the second analog signal;
a spectrum despread unit coupled to the first analog-to-digital converter and configured to generate the spectrum despread signal according to the first digital signal and the second spread vector, wherein the spectrum despread unit comprises:
a correlator configured to generate a second digital signal according to the first digital signal and the second spread vector; and
a synchronous sampler configured to perform synchronous sampling on the second digital signal to generate the spectrum despread signal; and
a first processor configured to generate first detection data according to the spectrum despread signal wherein the first detection data is corresponding to spatial information of the measured object;
wherein a format of the first spread vector and a format of the second spread vector comprise numerals; and
the first processor is further configured to generate the second spread vector according to the first digital signal and update the first spread vector according to the second spread vector, or the first processor is further configured to update the first spread vector according to the first digital signal and generate the second spread vector according to the first spread vector.

2. The signal processing system of claim 1, wherein the spatial information comprises a displacement of the measured object, a moving velocity of the measured object and/or a distance between the measured object and the signal processing system.

3. The signal processing system of claim 1, further comprising:
a carrier signal generator coupled to the first mixer and the second mixer and configured to provide the first carrier signal and the second carrier signal wherein frequencies of the first carrier signal and the second carrier signal are substantially identical.

4. The signal processing system of claim 1, wherein the first data signal comprises a set of repeated identical symbols, numeral pulse amplitude modulation (PAM) symbols or binary phase shift keying (BPSK) symbols.

5. The signal processing system of claim 1, wherein the spread spectrum signal comprises a direct-sequence spread signal.

6. The signal processing system of claim 1, wherein the first spread vector is identical to the second spread vector substantially.

7. The signal processing system of claim 1 further comprising:
a second transmission module configured to generate and transmit a second transmission radio frequency signal according to the first data signal and a third spread vector; and
a second reception module configured to receive a second reception radio frequency signal;
wherein the second reception radio frequency signal is corresponding to the second transmission radio frequency signal, and the third spread vector is orthogonal to the first spread vector substantially.

8. The signal processing system of claim 1 further comprising:
a second transmission module to an $L_{th}$ transmission module wherein an $i_{th}$ transmission module is configured to transmit an $i_{th}$ transmission radio frequency signal corresponding to an $i_{th}$ transmission vector and an $i_{th}$ data signal, the $i_{th}$ transmission vector is orthogonal to the first spread vector, i and L are positive integers, and $2 \leq i \leq L$; and
a second reception module to an $L_{th}$ reception module wherein an $i_{th}$ reception module is configured to receive an $i_{th}$ reception radio frequency signal and generate an $i_{th}$ spectrum despread signal;
wherein an $L_{th}$ processor obtains the spatial information according to the spectrum despread signal and a second spectrum despread signal to an $L_{th}$ spectrum despread signal.

9. The signal processing system of claim 1 further comprising:
a second transmission module to an $L_{th}$ transmission module wherein an $i_{th}$ transmission module is configured to transmit an $i_{th}$ transmission radio frequency signal corresponding to an $i_{th}$ transmission vector and an $i_{th}$ data signal, the $i_{th}$ transmission vector is orthogonal to the first spread vector, i and L are positive integers, and $2 \leq i \leq L$; and
a second reception module to an $L_{th}$ reception module wherein an $i_{th}$ reception module is configured to receive an $i_{th}$ reception radio frequency signal and the second spread vector, and generate an $i_{th}$ spectrum despread signal, the $i_{th}$ reception radio frequency signal being generated by having the $i_{th}$ transmission radio frequency signal reflected by the measured object;
wherein the first processor or an $i_{th}$ processor obtains the spatial information according to the spectrum despread signal and a second spectrum despread signal to an $L_{th}$ spectrum despread signal.

10. The signal processing system of claim 1 further comprising:
- a second transmission module to an $L_{th}$ transmission module wherein an $i_{th}$ transmission module is configured to transmit an $i_{th}$ transmission radio frequency signal corresponding to an $i_{th}$ transmission vector and an $i_{th}$ data signal, i and L are an positive integers, and $2 \leq i \leq L$; and
- a second reception module to an $L_{th}$ reception module wherein an $i_{th}$ reception module is configured to receive an $i_{th}$ reception radio frequency signal and generate an $i_{th}$ spectrum despread signal; and
- a second processor to an $L_{th}$ processor configured to transmit a second detection data to an $L_{th}$ detection data to the first processor respectively for the first processor to generate the spatial information according to the first detection data to the $L_{th}$ detection data wherein an $i_{th}$ processor is coupled to the $i_{th}$ transmission module and the $i_{th}$ reception module and configured to generate $i_{th}$ detection data according to the $i_{th}$ spectrum despread signal, the $i_{th}$ transmission vector is orthogonal to the first spread vector substantially, the first processor is a master processor, and the second processor to the $L_{th}$ processor are slave processers.

11. The signal processing system of claim 10, wherein:
the second processor to the $L_{th}$ processor are further configured to load the second detection data to the $L_{th}$ detection data into a second detection data signal to an $L_{th}$ detection data signal respectively;
the second transmission module to the $L_{th}$ transmission module are configured to generate and transmit a second data radio frequency signal to an $L_{th}$ data radio frequency signal according to the second detection data signal to the $L_{th}$ detection data signal and a second data transmission vector and an $L_{th}$ data transmission vector respectively;
the first reception module is further configured to receive the second data radio frequency signal to the $L_{th}$ data radio frequency signal and generate a second spectrum despread data signal to an $L_{th}$ spectrum despread data signal according to a second data reception vector to an $L_{th}$ data reception vector; and
the first processor is further configured to generate the first detection data to the $L_{th}$ detection data according to the second spectrum despread data signal to the $L_{th}$ spectrum despread data signal respectively.

12. The signal processing system of claim 1 further comprising:
- a third mixer coupled to the spread spectrum unit and configured to mix the spread spectrum signal and a first internal carrier to shift a frequency of the first transmission radio frequency signal by an intermediate frequency corresponding to the first internal carrier for reducing an effect caused by flicker noise; and
- a digital frequency synthesizer coupled to the third mixer and configured to provide the first internal carrier;
wherein the first digital-to-analog converter is further configured to have a $\Sigma\alpha$ modulation function.

13. The signal processing system of claim 12, wherein:
the spectrum despread unit comprises:
- a first correlator configured to generate a second digital signal according to the second spread vector and the first digital signal;
- a second correlator configured to generate a third digital signal according to the second spread vector and the second digital signal; and
- a synchronous sampler configured to generate the spectrum despread signal by performing synchronous sampling on the second digital signal and the third digital signal;

the digital frequency synthesizer is further configured to provide a second internal carrier; and
the signal processing system further comprises:
- a first decimation filter coupled to the first analog-to-digital unit and configured to generate a low frequency portion of the first digital signal;
- a fourth mixer coupled to the digital frequency synthesizer and the first decimation filter and configured to mix the first internal carrier and the low frequency portion of the first digital signal for generating a quadrature modulated portion of the low frequency portion of the first digital signal;
- a fifth mixer coupled to the digital frequency synthesizer and the first decimation filter and configured to mix the second internal carrier and the low frequency portion of the first digital signal for generating an in-phase modulated portion of the low frequency portion of the first digital signal;
- a second decimation filter coupled between the fourth mixer and the first correlator and configured to transmit a low frequency portion of the quadrature modulated portion to the first correlator; and
- a third decimation filter coupled between the fifth mixer and the second correlator and configured to transmit a low frequency portion of the in-phase modulated portion to the second correlator.

14. The signal processing system of claim 13 further comprising:
- a fourth decimation filter coupled to the synchronous sampler and the first processor and configured to transmit a low frequency portion of a quadrature modulated portion of the spectrum despread signal to the first processor; and
- a fifth decimation filter coupled to the synchronous sampler and the first processor and configured to transmit a low frequency portion of an in-phase modulated portion of the spectrum despread signal to the first processor.

15. A signal processing system comprising:
a reception module comprising:
- a reception terminal configured to receive a radio frequency signal comprising transmission data;
- a first mixer coupled to the reception terminal and configured to mix the radio frequency signal with a first carrier signal for generating a first analog signal;
- an analog-to-digital converter coupled to the first mixer and configured to generate a digital signal according to the first analog signal; and
- a spectrum despread unit coupled to the analog-to-digital converter and configured to generate a spectrum despread signal according to the digital signal and a first spread vector, wherein the spectrum despread unit comprises:
  - a correlator configured to generate a second digital signal according to the first digital signal and a second spread vector; and
  - a synchronous sampler configured to perform synchronous sampling on the second digital signal to generate the spectrum despread signal; and
a processor configured to generate the transmission data according to the spectrum despread signal;
wherein a format of the first spread vector and a format of the second spread vector comprise numerals; and the processor is further configured to generate the second spread vector according to the digital signal and update the first spread vector according to the second spread vector, or the processor is further configured to update the first spread vector according to the digital signal and generate the second spread vector according to the first spread vector.

16. The signal processing system of claim 15, wherein the second spread vector is transmitted to a transmission module.

17. The signal processing system of claim 16 further comprising:
    the transmission module comprising:
        a spread spectrum unit configured to generate a spread spectrum signal according to the transmission data and the second spread vector;
        a digital-to-analog converter configured to generate a second analog signal according to the spread spectrum signal;
        a second mixer coupled to the digital-to-analog converter and configured to mix the second analog signal with a second carrier signal for generating the radio frequency signal;
        a transmission terminal coupled to the second mixer and configured to transmit the radio frequency signal;
        wherein the processor is further configured to update the second spread vector according to the first spread vector and the digital signal.

18. A signal processing method for controlling a signal processing system to detect spatial information of a measured object, the method being run on a radar or a signal processing unit, and the method comprising:
    generating a spread spectrum signal according to a data signal and a first spread vector;
    receiving the spread spectrum signal and generating a first analog signal according to the spread spectrum signal;
    mixing the first analog signal and a first carrier signal for generating a transmission radio frequency signal;
    transmitting the transmission radio frequency signal for the transmission radio frequency signal to be reflected by a measured object to generate a reception radio frequency signal;
    mixing the reception radio frequency signal and a second carrier signal to generate a second analog signal;
    receiving the second analog signal and generating a digital signal according to the second analog signal;
    generating a spectrum despread signal according to the digital signal and a second spread vector;
    generating detection data corresponding to the spatial information of the measured object according to the spectrum despread signal; and
    generating the second spread vector according to the first digital signal and updating the first spread vector according to the second spread vector, or updating the first spread vector according to the first digital signal and generating the second spread vector according to the first spread vector;
    wherein a format of the first spread vector and a format of the second spread vector comprise numerals.

* * * * *